United States Patent [19]

Onishi et al.

[11] Patent Number: 5,220,263

[45] Date of Patent: Jun. 15, 1993

[54] CHARGING CONTROL SYSTEM FOR MOVING ROBOT SYSTEM

[75] Inventors: Masanori Onishi; Hidemitsu Tabata; Teppei Yamashita; Masanao Murata, all of Ise, Japan

[73] Assignee: Shinko Electric Co., Ltd., Tokyo, Japan

[21] Appl. No.: 675,482

[22] Filed: Mar. 26, 1991

[30] Foreign Application Priority Data

Mar. 28, 1990 [JP] Japan ................................. 2-80164

[51] Int. Cl.$^5$ .......................... G05D 1/00; G06F 15/50
[52] U.S. Cl. .............................. 318/587; 318/568.12; 180/168; 364/424.02
[58] Field of Search ........................... 318/568–589, 318/139; 364/424.01, 424.02, 424.06; 307/10; 320/15, 2; 180/168–169, 65.1–65.7

[56] References Cited

U.S. PATENT DOCUMENTS

| | | | |
|---|---|---|---|
| 4,706,120 | 11/1987 | Slaughter et al. | 180/168 |
| 4,777,416 | 10/1988 | George, II et al. | 318/568 |
| 5,023,790 | 6/1991 | Luke, Jr. | 318/587 |

OTHER PUBLICATIONS

Chen, et al., "Task Assignment And Load Balancing of Autonomous Vehicles In A Flexible Manufacturing System", *IEEE Journal of Robotics and Automation*, vol. RA-3, No. 6, Dec., 1987, pp. 659–671.

Krebs, et al., "A Real-Time AGV-Scheduling System . . . ", *IEEE 1989 International Conference on System, Man, And Cybernetics*, vol. III, Nov. 14, 1989, pp. 965–970.

*Primary Examiner*—Paul Ip
*Attorney, Agent, or Firm*—Spensley Horn Jubas & Lubitz

[57] ABSTRACT

A moving robot system, employing a charging control system for robots, is configured by plural moving robots, at least one charging station and a control station. Each moving robot is designed to perform an operation thereof in accordance with programs stored therein under control of the control station. When the power of a charging-type-battery equipped in each moving robot is consumed and lowered to the predetermined level, it automatically moves to its nearest charging station designated by the control station other than the charging station which is used for another moving robot. In this case, the control station controls the moving robots such that plural moving robots are not simultaneously concentrated to one charging station.

5 Claims, 4 Drawing Sheets

CHARGING CONTROL SYSTEM FOR MOVING ROBOT SYSTEM

BACKGROUND OF THE INVENTION

1. Field of the Invention

The present invention relates to a charging control system for a moving robot system wherein each of plural moving robots (or mobile robots) is controlled to automatically move to a designated point at which the predetermined operation assigned thereto is to be performed.

2. Prior Art

Recently, the moving robots capable of automatically moving by themselves are frequently adopted in the factory automation system (i.e., FA system).

As the representative of the conventional system including the moving robot, there is provided a moving robot system which contains plural moving robots and control station for controlling them. In accordance with the commands from the control station, each moving robot automatically moves to the specific point such as its working point and charging station wherein it carries out the predetermined operation. The control station is designed to manage map information representing the moving area of the moving robot, and it also monitors the current position of the moving robot and whether or not the moving robot is now under operation. In this case, this control system carries out the operation command to the moving robot while communicating with the moving robot by use of the wire-communication or radio-communication.

In addition, the moving robot is driven and run by an electric motor which is usually driven by a charging-type-battery. Herein, the control station measures the passing time to be passed after the charging-type-battery is charged. Then, by every predetermined passing time (e.g., sixty minutes), the control station controls the moving robot to carry out the charging operation. In this case, the control station informs the moving robot the position of its nearest charging station. Then, the moving robot automatically moves to such charging station by itself. Thereafter, the moving robot automatically engages the power-receiving coupler thereof with the power-supply coupler provided at the charging station so that the charging-type-battery thereof is to be charged.

As described above, according to the conventional charging control system, the control station is designed to measure the passing time of the charging-type-battery of each moving robot. Therefore, the special programs must be provided for the control station to manage the passing times of the moving robots. For this reason, there is a disadvantage in that the processings of the control station must be complicated.

SUMMARY OF THE INVENTION

Accordingly, it is an object of the present invention to provide a charging control system by which the charging operations of the robots can be carried out efficiently.

In a first aspect of the present invention, there is provided a moving robot system employing a charging control system comprising:

a plurality of moving robots each providing a charging-type-battery by which power each moving robot is moved, each moving robot being automatically moved to perform its operation in accordance with programs stored therein;

at least one charging station at which each moving robot is moved to perform a charging operation when power of a charging-type-battery is lowered to a predetermined level; and control station for controlling a movement and an operation of each moving robot by communicating with each moving robot, wherein the control station controls the moving robots such that plural moving robots are not simultaneously moved to one charging station to perform the charging operation.

In a second aspect of the present invention, there is provided a charging control system for robots providing a plurality of charging stations, a control station for designating one of a plurality of charging stations and a plurality of moving robots each of which is automatically moved to a corresponding charging station by use of the power in a charging-type-battery equipped therein, wherein each moving robot provides judging means for judging whether or not a charging operation is requested for the charging-type-battery equipped in each moving robot and transmitting means for transmitting a charge request signal to the control station when the judging means judges that the charging operation is requested, while the control station provides receiving means for receiving the charge request signal, searching means for searching the nearest charging station for one moving robot within all charging stations other than the charging station designated for another moving robot and designating means for designating the nearest charging station searched by the searching means to one moving robot, so that one moving robot automatically moves to the designated charging station at which it performs a charging operation.

In a third aspect of the present invention, there is provided a charging control method for a moving robot system providing a plurality of moving robots, a plurality of charging stations and a control station, wherein the charging control method comprising steps of:

judging whether or not each moving robot request a charging operation to be performed on a charging-type-battery thereof, thereby outputting a charge request signal from each moving robot to the control station when power level of the charging-type-battery becomes lower than a predetermined level; and searching the nearest charging station for each moving robot which outputs the charge request signal within a plurality of charging stations other than the charging station which is used for another moving robot, thereby designating the searched charging station as a destination for each moving robot, whereby under control of the control station, each moving robot is automatically moved to the designated destination at which the charging operation is to be performed.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF A PREFERRED EMBODIMENT

Figure 1:
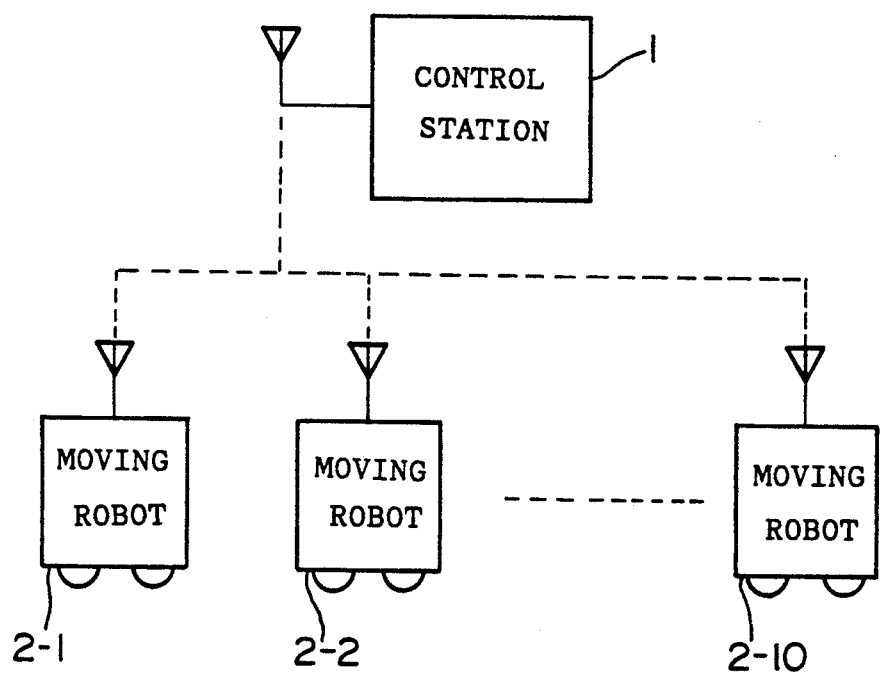
FIG. 1 is a block diagram showing the whole configuration of a moving robot system employing a charging control system according to an embodiment of the present invention.

Now, description will be given with respect to a preferred embodiment of the present invention by referring to the drawings.

[A] Configuration

FIG. 1 is a block diagram showing the whole configuration of the moving robot system which employs a charging control system according to the present invention.

Figure 4:
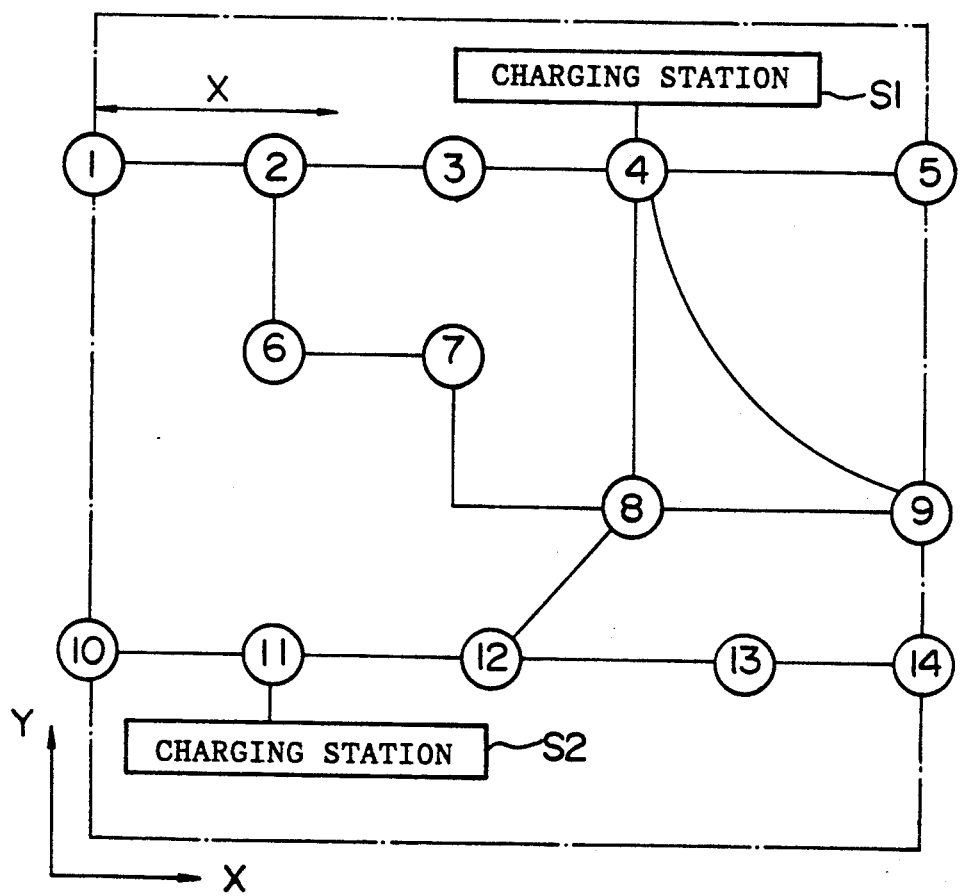
FIG. 4 is a map illustrating an example of moving paths through which a moving robot is to be moved.

In FIG. 1, 1 designates a control station, and 2-1 to 2-10 designate moving robots (hereinafter, each robot will be represented by numeral "2"). Herein, the control station 1 is communicated with each moving robot 2 by the radio-communication. Each moving robot 2 is designed to move along the magnetic tape attached on the floor surface of the predetermined moving path as shown in FIG. 4. In addition, node marks (see ① to ⑭ ) are adequately positioned on the moving path at equal intervals.

Figure 2:
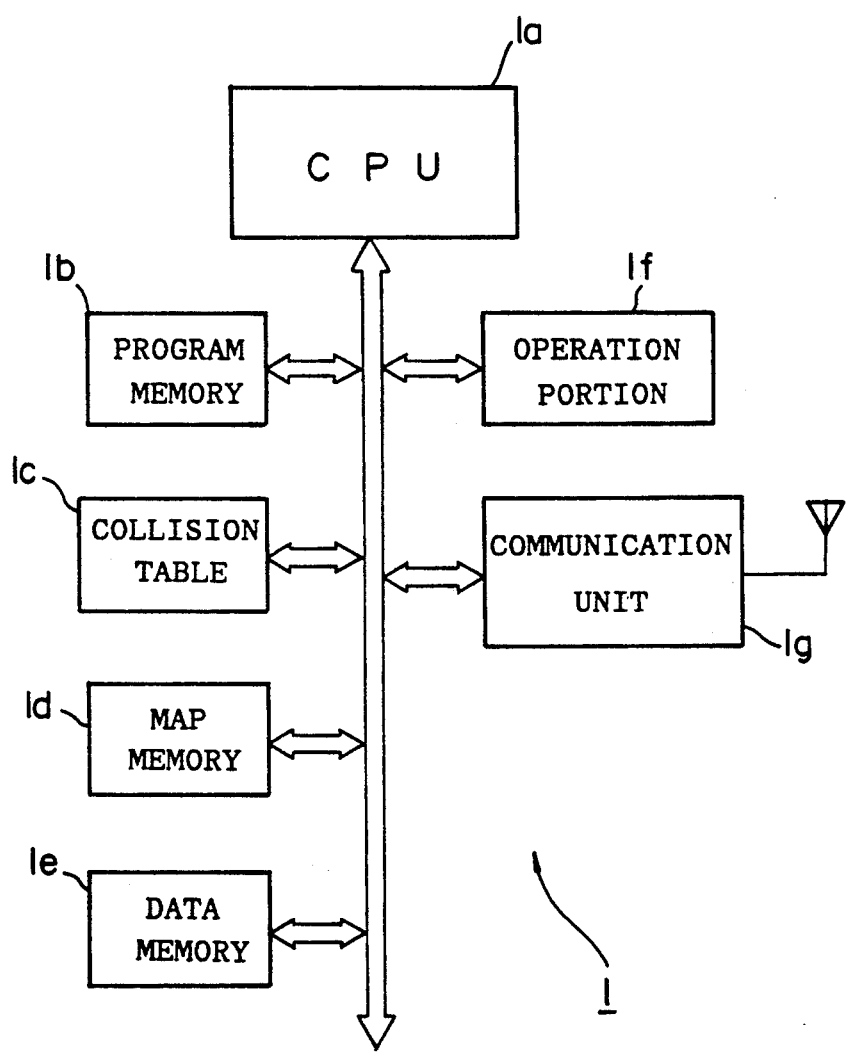
FIG. 2 is a block diagram showing an electric configuration of a control station provided in the system shown in FIG. 1.

FIG. 2 is a block diagram showing the electric configuration of the control station 1. In FIG. 2, 1a designates a central processing unit (CPU), 1b designates a program memory which stores programs to be executed in CPU 1a and 1c designates a collision table. This collision table 1c memorizes data by which the collision between the robots can be avoided.

In addition, 1d designates a map memory which memorizes X-Y coordinates of each node (see ① to ⑭ in FIG. 4), data representative of the kind of each node (which denotes the working station, charging station etc.), numbers of nodes connected to each node, data representative of the distance between the nodes and the like. Further, this map memory 1d memorizes the coordinates of charging stations S1, S2 provided on the floor surface.

Further, 1e designates a data memory for storing data, and 1f designates an operation portion containing a keyboard. Furthermore, 1g designates a communication unit for communicating with the moving robot 2, which configuration and operation will be described later. This communication unit 1g transmits the data supplied from the CPU 1a by the carrier wave having frequency of 200 MHz to 300 MHz. On the other hand, the communication unit 1g receives the data which are transmitted from the moving robots 2-1 to 2-10 by the carrier wave.

Figure 3:
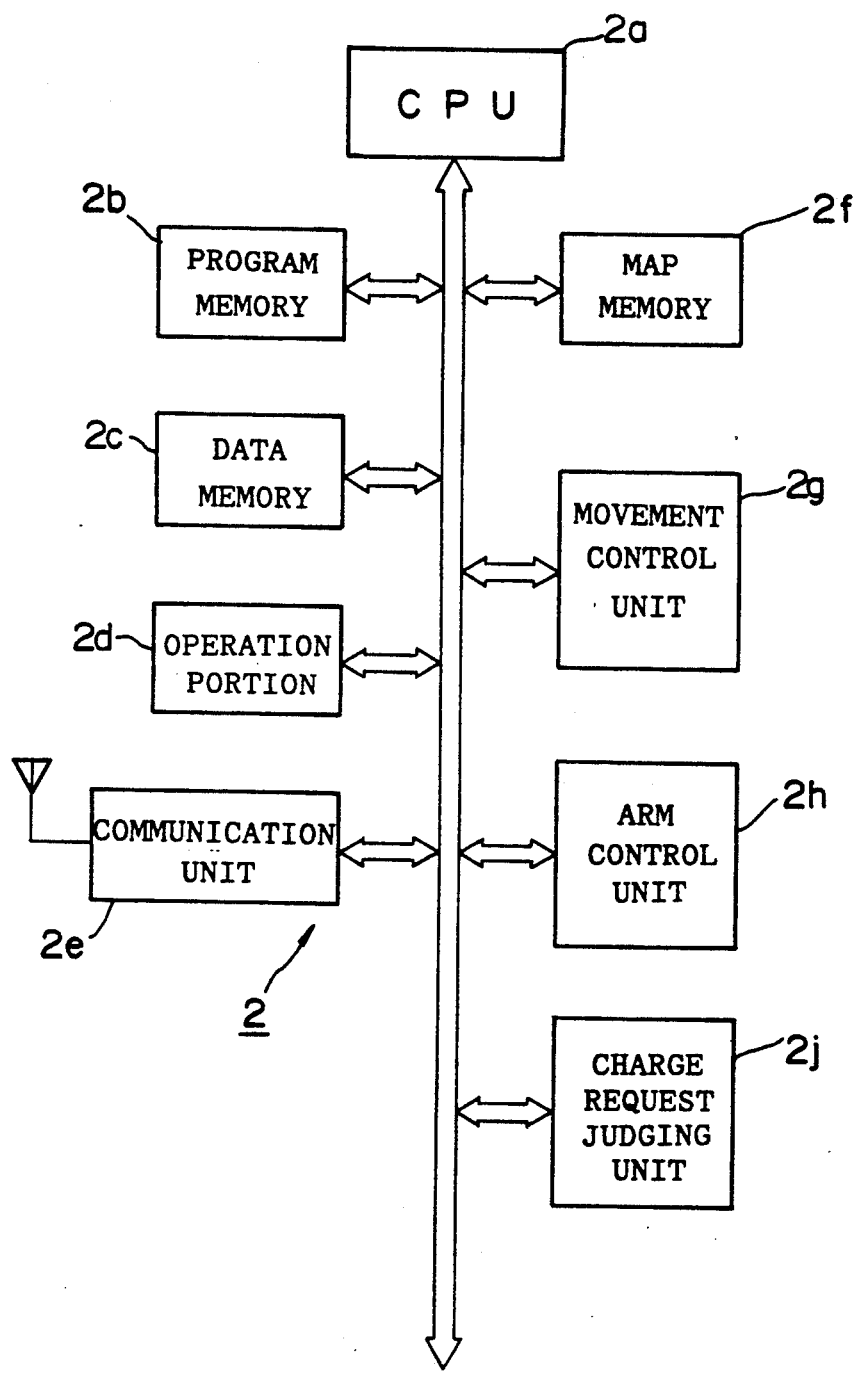
FIG. 3 is a block diagram showing an electric configuration of a moving robot.

FIG. 3 is a block diagram showing the electric configuration of the moving robot 2.

In FIG. 3, 2a designates a CPU; 2b designates a program memory for storing programs to be executed in CPU; 2c designates a data memory for storing data; 2d designates an operation portion containing a keyboard; and 2e designates a communication unit which performs communication with the control station 1. In addition, 2f designates a map memory which has the same configuration of the foregoing map memory 1d equipped within the control station 1, so that it memorizes moving path data.

Further, 2g designates a movement control unit. When receiving the destination data from the CPU 2a, the movement control unit 2g senses the magnetic tape and node mark provided on the floor surface by use of a magnetic sensor, thereby controlling the drive motor of the robot so that the moving robot is to be moved to the target node indicated by the destination data.

Furthermore, 2h designates an arm control unit. When receiving the operation program number from the CPU 2a, the arm control unit 2h reads out the operation program corresponding to the operation program number from an internal memory provided therein at a time when the moving robot reaches the operation node. Thus, in accordance with the read program, the arm control unit 2h controls a robot arm to perform several kinds of operations.

Moreover, the moving robot 2 provides a charge request judging unit 2j which judges whether or not the charging operation for the charging-type-battery is requested. This charge request judging unit 2j contains a battery voltage detecting unit and a timer unit (not shown). This battery voltage detecting unit always monitors the battery voltage, so that when the voltage of the charging-type-battery is lowered to the predetermined level, it transmits an electric signal to the CPU 2a. On the other hand, the timer unit measures the passing time to be passed after the charging-type-battery has been charged. When the passing time to be measured reaches the predetermined time (e.g., sixty minutes), the timer unit sends an electric signal to the CPU 2a.

[B] Operation

Next, description will be given with respect to the operation of the moving robot system.

Upon receipt of the command from the control station 1, the moving robot 2 refers to the contents of the map memory 2f, so that it moves to its destination by driving the movement control unit 2g and it also performs the predetermined operation by driving the arm control unit 2h. Since the above-mentioned movement and operation are made by the power charged in the charging-type-battery equipped in the moving robot 2, the power is gradually consumed so that the voltage of the charging-type-battery is slightly lowered.

Then, the charge request judging unit 2j judges that the charging operation is required. In other words, the CPU 2a receives one of two electric signals to be firstly transmitted thereto, i.e., one of the electric signal which is outputted from the battery voltage detecting unit when the battery voltage is lowered to the predetermined level and another electric signal which is outputted from the timer unit when the passing time reaches the predetermined time. At this time, the CPU 2a accesses to the program memory 2b, so that the communication unit 2e transmits a charge request signal to the control station 1.

The above-mentioned charge request signal is transmitted to the CPU 1a from the communication unit 1g, the CPU 1a accesses to a charging station registration table (not shown) provided within the data memory 1e. Herein, the charging station registration table contains storage areas each corresponding to each of plural identification codes for the charging stations. When the control station 1 designates certain charging station for the moving robot 2, a recognition symbol is stored in the storage area corresponding to the identification code for the designated charging station. In addition, when receiving a charge end signal from the moving robot 2, indicating that the charging operation is completed, the control station 1 cancels the recognition symbol. Therefore, by searching the storage tables of the charging station registration table, it is possible to detect the stored recognition symbol corresponding to the identification code for the charging station at which the charging operation is now performed on the moving robot 2 or to which the moving robot 2 is moved to perform the charging operation.

Further, when the charge request signal is received by the communication unit 1g and transmitted to the CPU 1a within the control station 1, the CPU 1a accesses to the program memory 1b and refers to the map memory 1d to thereby search the nearest charging station. With respect to the searched charging station, the CPU 1a searches the foregoing charge station registration table, thereby detecting whether or not the recognition symbol is stored in the storage area corresponding to the identification code for the searched charging station.

In the case where the recognition symbol is not stored in the storage area, the recognition symbol is registered in such storage area. Then, the identification code for charging station is transmitted to the moving robot 2.

On the other hand, when the recognition symbol has been already registered in the storage area, the CPU 1a searches the nearest station from the charging stations other than the charging station corresponding to the recognition symbol by referring to the map memory 1d as described above. Thereafter, the searching operation is repeatedly performed on the charging station registration table and charging station, so that the CPU 1a searches the identification code for charging station corresponding to the storage area which does not store the recognition symbol. Then, such identification code for charging station is transmitted to the moving robot 2.

When the identification code for charging station is transmitted to the moving robot 2, the moving robot 2 refers to the map memory 2f provided therein to thereby drive the movement control unit 2g, so that it automatically moves toward the designated charging station.

Thereafter, when reaching at the charging station, the moving robot 2 connects the power-receiving coupler thereof to the power-supply coupler of the charging station, so that the charging-type-battery thereof is automatically charged. When completing the charging operation, the moving robot 2 transmits the foregoing charge end signal to the control station 1. Afterwards, the moving robot 2 moves or performs several kinds of operations in accordance with the commands from the control station 1.

According to the present embodiment, the moving robot 2 is designed to spontaneously send the charge request signal to the control station 1 when the battery voltage becomes lower than the predetermined level or when the passing time to be passed after the charging operation is performed becomes longer than the predetermined passing time, in other words, when it becomes necessary to perform the charging operation on the charging-type-battery. Thus, unlike the prior art, the present embodiment can offer a simple processing for the control station 1 which does not require the program for monitoring the charging time for the moving robot 2.

In addition, by searching the charging station registration table in the control station 1, it is possible to acknowledge the pre-occupied charging stations to which the moving robots 2 are now moving to perform the charging operation. Therefore, the control station 1 can designate the nearest charging station within all charging stations other than the pre-occupied charging stations, so that the moving robot 2 can automatically move to the designated charging station. Thus, it is possible to avoid a concentration in which plural moving robots move to the same pre-occupied charging station. In other words, it is possible to allocate the moving robots 2 to respective charging stations, so that the moving robots 2 can be controlled to be moved in an efficient manner.

Lastly, this invention may be practiced or embodied in still other ways without departing from the spirit or essential character thereof. Therefore, the preferred embodiment described herein is illustrative and not restrictive, the scope of the invention being indicated by the appended claims and all variations which come within the meaning of the claims are intended to be embraced therein.

What is claimed is:

1. A moving robot system employing a charging control system comprising:

a plurality of moving robots each including a charging-type-battery by which each moving robot is moved, each moving robot being automatically moved to perform its operation in accordance with programs stored therein;

at least one charging station at which each moving robot is moved to perform a charging operation when power of the charging-type-battery is below a predetermined level; and a control station for controlling movement and operation of each moving robot by communicating with each moving robot, said control station providing a collision avoiding means by which said moving robots each requiring a charging operation are controlled not to simultaneously move to one charging station when performing the charging operation.

2. A moving robot system as defined in claim 1 wherein each moving robot provides judging means for judging whether or not a charging operation is required for the charging-type-battery by detecting the charged power to be consumed while each moving robot moves.

3. A moving robot system as defined in claim 1 wherein said control station provides searching means for searching and designating the nearest charging station for each moving robot within plural charging stations other than the charging station which is used for another moving robot, so that each moving robot is moved to the designated charging station to perform its charging operation.

4. In a charging control system for a moving robot system providing a plurality of charging stations, a control station for designating one of said plurality of charging stations and a plurality of moving robots each of which is automatically moved to a corresponding charging station by use of the power in a charging-type-battery equipped therein, said charging control system comprising:

judging means, provided in each moving robot, for judging whether or not a charging operation is requested for said charging-type-battery in each moving robot;

transmitting means, provided in each moving robot, for transmitting a charge request signal to said control station when said judging means judges that the charging operation is requested;

receiving means, provided in said control station, for receiving said charge request signal;

searching means, provided in said control station, for searching the nearest charging station for one moving robot within all charging stations other than the charging station designated for another moving robot; and designating means for designating the nearest charging station searched by said searching means to one moving robot, so that one moving robot automatically moves to the designated charging station at which it performs a charging operation, said control station providing a collision avoiding means by which said moving robots each requiring a charging operation are controlled not to simultaneously move to one charging station when performing the charging operation.

5. In a charging control method for a moving robot system providing a plurality of moving robots, a plurality of charging stations and a control station, said charging control method comprising steps of:

judging whether or not each moving robot request a charging operation to be performed on a charging-type-battery thereof, thereby outputting a charge request signal from each moving robot to said control station when power level of the charging-type-battery becomes lower than a predetermined level;

searching the nearest charging station for each moving robot which outputs said charge request signal within said plurality of charging stations other than the charging station which is used for another moving robot, thereby designating the searched charging station as a destination for each moving robot; and controlling the moving robots requiring a charging operation so as not to move simultaneously to one charging station when performing the charging operation, whereby under control of said control station, each moving robot is automatically moved without collision with the other moving robots to the designated destination at which the charging operation is to be performed.

* * * * *